US010815798B2

(12) United States Patent
Kray et al.

(10) Patent No.: US 10,815,798 B2
(45) Date of Patent: Oct. 27, 2020

(54) TURBINE ENGINE BLADE WITH LEADING EDGE STRIP

(71) Applicant: GENERAL ELECTRIC COMPANY, Schenectady, NY (US)

(72) Inventors: Nicholas Joseph Kray, Mason, OH (US); Gregory Carl Gemeinhardt, Park Hills, KY (US); Douglas Duane Ward, West Chester, OH (US); David William Crall, Loveland, OH (US)

(73) Assignee: General Electric Company, Schenectady, NY (US)

( * ) Notice: Subject to any disclaimer, the term of this patent is extended or adjusted under 35 U.S.C. 154(b) by 172 days.

(21) Appl. No.: 15/891,415

(22) Filed: Feb. 8, 2018

(65) Prior Publication Data
US 2019/0242260 A1 Aug. 8, 2019

(51) Int. Cl.
*F01D 5/28* (2006.01)
*F01D 21/04* (2006.01)
*F01D 5/14* (2006.01)
*B23P 15/04* (2006.01)

(52) U.S. Cl.
CPC .............. *F01D 5/288* (2013.01); *B23P 15/04* (2013.01); *F01D 5/147* (2013.01); *F01D 5/282* (2013.01); *F01D 21/045* (2013.01); *F05D 2220/323* (2013.01); *F05D 2220/36* (2013.01); *F05D 2230/23* (2013.01); *F05D 2230/232* (2013.01); *F05D 2230/237* (2013.01); *F05D 2240/24* (2013.01); *F05D 2240/303* (2013.01); *F05D 2240/307* (2013.01); *F05D 2300/133* (2013.01); *F05D 2300/171* (2013.01);
(Continued)

(58) Field of Classification Search
CPC .......... F01D 5/288; F01D 5/286; F01D 5/282; F01D 5/28; F01D 21/045; F04D 29/324; F04D 29/325; F04D 29/388; B64C 11/205
USPC ........................................................ 416/224
See application file for complete search history.

(56) References Cited

U.S. PATENT DOCUMENTS 4,006,999 A * 2/1977 Brantley ................. F01D 5/282
416/224
4,022,540 A    5/1977 Young
(Continued)

FOREIGN PATENT DOCUMENTS

| CN | 104246139 A | 12/2014 | |
|---|---|---|---|
| CN | 107044445 A | 8/2017 | |
| DE | 102010004663 A1 * | 7/2011 | ............. F01D 5/282 |

OTHER PUBLICATIONS

English translation of Chinese Patent Office, Office Action re Corresponding Application No. 201910106733.6, dated Apr. 26, 2020 (Year: 2020).*

(Continued)

*Primary Examiner* — Michael Lebentritt
*Assistant Examiner* — Topaz L. Elliott
(74) *Attorney, Agent, or Firm* — McGarry Bair PC (57) ABSTRACT

A blade for the fan section of a turbine engine comprising a composite core defining a pressure side and a suction side extending axially between a core leading edge and a core trailing edge defining a chord-wise direction and extending radially between a core root and a core tip defining a span-wise direction and a leading edge strip made of materials with different elasticity and mounted to the core leading edge.

24 Claims, 7 Drawing Sheets

(52) U.S. Cl.
CPC .. *F05D 2300/173* (2013.01); *F05D 2300/174* (2013.01); *F05D 2300/501* (2013.01); *Y02T 50/671* (2013.01)

(56) References Cited

U.S. PATENT DOCUMENTS

| | | | | |
|---|---|---|---|---|
| 4,111,600 A | * | 9/1978 | Rothman | F01D 5/147 |
| | | | | 416/2 |
| 4,784,575 A | | 11/1988 | Nelson et al. | |
| 4,944,655 A | * | 7/1990 | Merz | B64C 11/26 |
| | | | | 416/146 R |
| 5,908,285 A | | 6/1999 | Graftt | |
| 7,114,912 B2 | | 10/2006 | Gerez et al. | |
| 7,762,781 B1 | | 7/2010 | Brown et al. | |
| 7,780,410 B2 | * | 8/2010 | Kray | B23P 15/04 |
| | | | | 415/9 |
| 7,841,834 B1 | * | 11/2010 | Ryznic | B23P 6/005 |
| | | | | 416/224 |
| 7,871,716 B2 | * | 1/2011 | Vance | F23R 3/007 |
| | | | | 416/224 |
| 8,814,527 B2 | | 8/2014 | Huth et al. | |
| 9,222,362 B2 | * | 12/2015 | Ford | B22F 3/15 |
| 9,249,668 B2 | | 2/2016 | Fisk et al. | |
| 9,689,269 B2 | * | 6/2017 | Bottome | F01D 5/147 |
| 10,030,522 B2 | * | 7/2018 | Benson | F01D 5/282 |
| 10,450,870 B2 | | 10/2019 | Nandula et al. | |
| 2008/0075601 A1 | * | 3/2008 | Giusti | F01D 5/147 |
| | | | | 416/229 A |
| 2012/0028055 A1 | * | 2/2012 | Schmidt | B32B 27/40 |
| | | | | 428/450 |
| 2015/0218953 A1 | * | 8/2015 | Bottome | F01D 5/147 |
| | | | | 416/224 |
| 2015/0252779 A1 | * | 9/2015 | Sievers | F03D 1/0675 |
| | | | | 416/229 R |
| 2016/0010470 A1 | * | 1/2016 | Moffitt | F01D 5/147 |
| | | | | 60/805 |
| 2016/0177731 A1 | * | 6/2016 | Benson | F01D 5/282 |
| | | | | 416/2 |
| 2016/0333705 A1 | | 11/2016 | Uihlein et al. | |
| 2017/0022826 A1 | * | 1/2017 | Read | F01D 5/28 |
| 2017/0321714 A1 | * | 11/2017 | Jain | F04D 29/023 |
| 2019/0368361 A1 | * | 12/2019 | Kray | F01D 5/20 |
| 2020/0182062 A1 | * | 6/2020 | Gemeinhardt | B23P 15/04 |

OTHER PUBLICATIONS

Chinese Patent Office, Office Action re Corresponding Application No. 201910106733.6, dated Apr. 26, 2020, 9 pages, China.

* cited by examiner

TURBINE ENGINE BLADE WITH LEADING EDGE STRIP

BACKGROUND OF THE INVENTION

Turbine engines include rotating components mounted to shafts and surrounded by shrouds and casings that provide structural support and air flow guidance through the machine. This disclosure relates generally to a turbine engine with a fan section and in particular one of the rotating components being a fan blade having a composite core. Fan blades can include a metal leading edge component mounted to the composite core.

The fan blades and other rotating components, including the compressors, and turbines, for example, rotate with a tip of the respective component passing very close to the shrouds or casings. During some events, for example, a bird ingestion into the gas turbine engine, the blades may contact the shrouds or casings. Also, during at least some such events, the blades may be released from gas turbine engines, i.e., "fan blade out" (FBO), and pose a threat to operators and bystanders as projectiles. Such events also typically cause damage to the shrouds or casings of the blades and to other components of gas turbine engines. The damage may also cause the gas turbine engine to operate with a lesser capability, necessitating repair.

BRIEF DESCRIPTION OF THE INVENTION

In one aspect, the disclosure relates to a blade for a turbine engine comprising a composite core extending axially between a core leading edge and a core trailing edge defining a chord-wise direction and extending radially between a core root and a core tip defining a span-wise direction, and a leading edge strip mounted to the core leading edge and having a first portion made from a first material and proximate the core root, and a second portion, made from a second material and extending from the first portion, having a modulus of elasticity less than the first material.

In another aspect, the disclosure relates to a blade for a turbine engine, the blade extending axially between a blade leading edge and a blade trailing edge defining a chord-wise direction and having an axial width, and extending radially between a blade root and a blade tip defining a span-wise direction, the blade comprising a composite core extending radially from the blade root to the blade tip and extending axially between a core leading edge and a core trailing edge, and a leading edge strip mounted to the core leading edge to define at least a portion of the blade leading edge, the leading edge strip having a frangible zone with a fuse defined where a first portion made from a first material joins a second portion made from a second material.

In yet another aspect, the disclosure relates to a method for forming a blade having a frangible zone, the method comprising forming a composite core extending axially between a core leading edge and a core trailing edge defining a chord-wise direction and extending radially between a core root and a core tip defining a span-wise direction, forming a leading edge strip having a first portion made from a first material and a second portion made from a second material having a lower modulus of elasticity than the first material, mounting the leading edge strip to the composite core, and forming a frangible zone defined by a fuse between the first and second portions.

DESCRIPTION OF EMBODIMENTS OF THE INVENTION

Aspects of the disclosure described herein are directed to a blade of a turbine engine, in particular a fan blade, where the fan blade includes a composite core and a leading edge strip having at least two portions made of at least two different metals. The two different metals have different moduli of elasticity to form a frangible zone of the fan blade. For purposes of illustration, the present disclosure will be described with respect to a fan blade in a turbine engine. It will be understood, however, that aspects of the disclosure described herein are not so limited and that a fan blade as described herein can be implemented in engines, including but not limited to turbojet, turboprop, turboshaft, and turbofan engines. Aspects of the disclosure discussed herein may have general applicability within non-aircraft engines having a fan blade, such as other mobile applications and non-mobile industrial, commercial, and residential applications.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the outlet of the engine or being relatively closer to the engine outlet as compared to another component. Additionally, as used herein, the terms "radial" or "radially" refer to a dimension extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
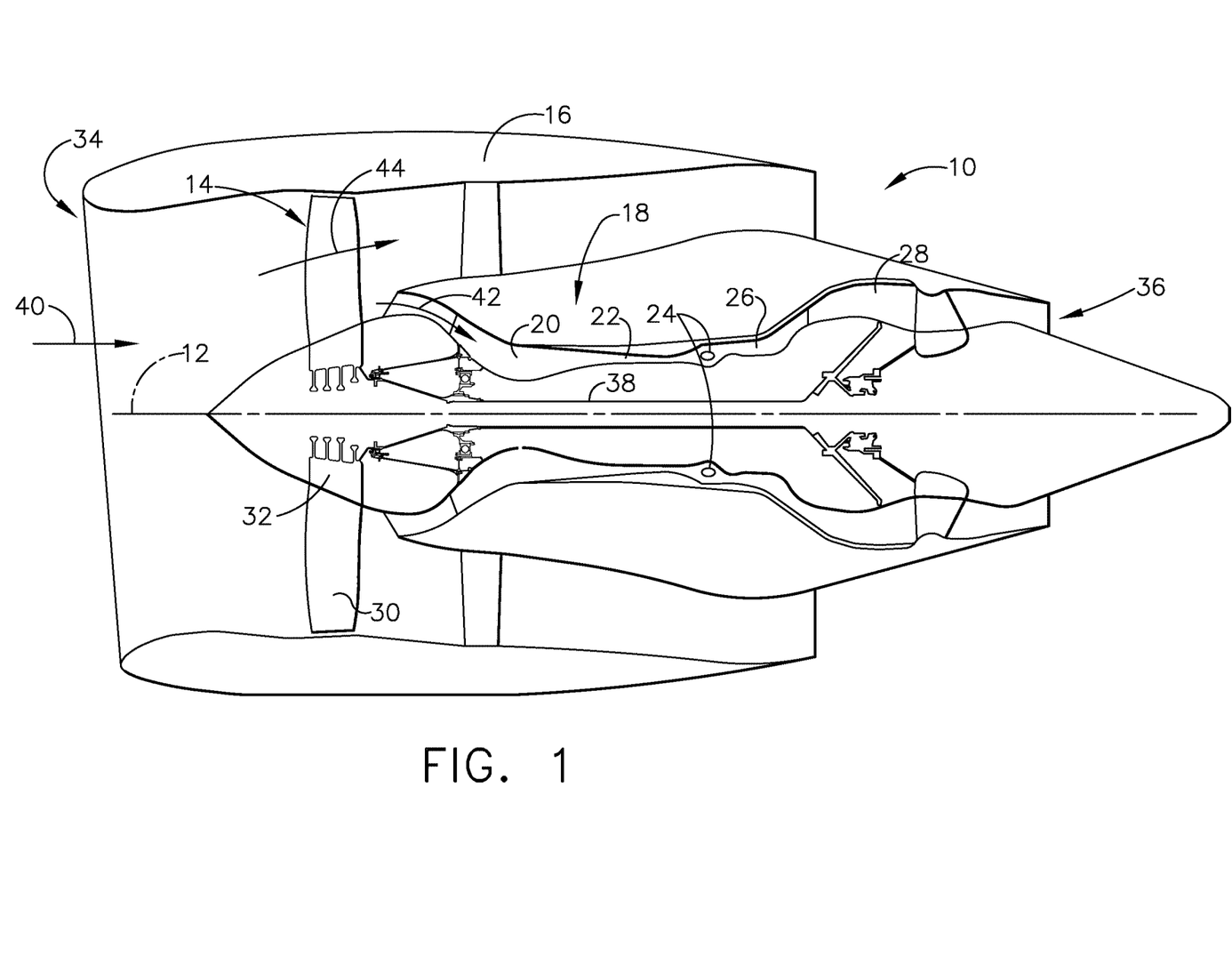
FIG. 1 is a schematic view of a turbine engine assembly including a fan assembly with a fan blade.

FIG. 1 illustrates an exemplary turbine engine assembly 10 having a longitudinal axis defining an engine centerline 12. A fan assembly 14, a nacelle 16, and a turbine engine core 18 can be included in the turbine engine assembly 10.

The turbine engine core 18 includes a low pressure compressor 20, a high pressure compressor 22, a combustor assembly 24, a high pressure turbine 26, and a low pressure turbine 28 arranged in a serial, axial flow relationship.

The fan assembly 14 includes an array of fan blades 30 extending radially outward from a rotor disc 32. The turbine engine assembly 10 has an intake side 34 and an exhaust side 36. The fan blades 30 and low pressure turbine 28 are coupled together with a rotor shaft 38. The fan assembly 14 and engine core 18 are at least partially positioned within the nacelle 16.

In operation, air 40 flows through the fan assembly 14 and a first portion 42 of the airflow is channeled through compressors 20, 22 wherein the first portion 42 of the airflow is further compressed and delivered to the combustor assembly 24. Hot products of combustion (not shown) from the combustor assembly 24 are utilized to drive turbines 26, 28 and thus produce engine thrust. A second portion 44 of the airflow discharged from fan assembly 14 is utilized to bypass around the turbine engine core 18.

Figure 2:
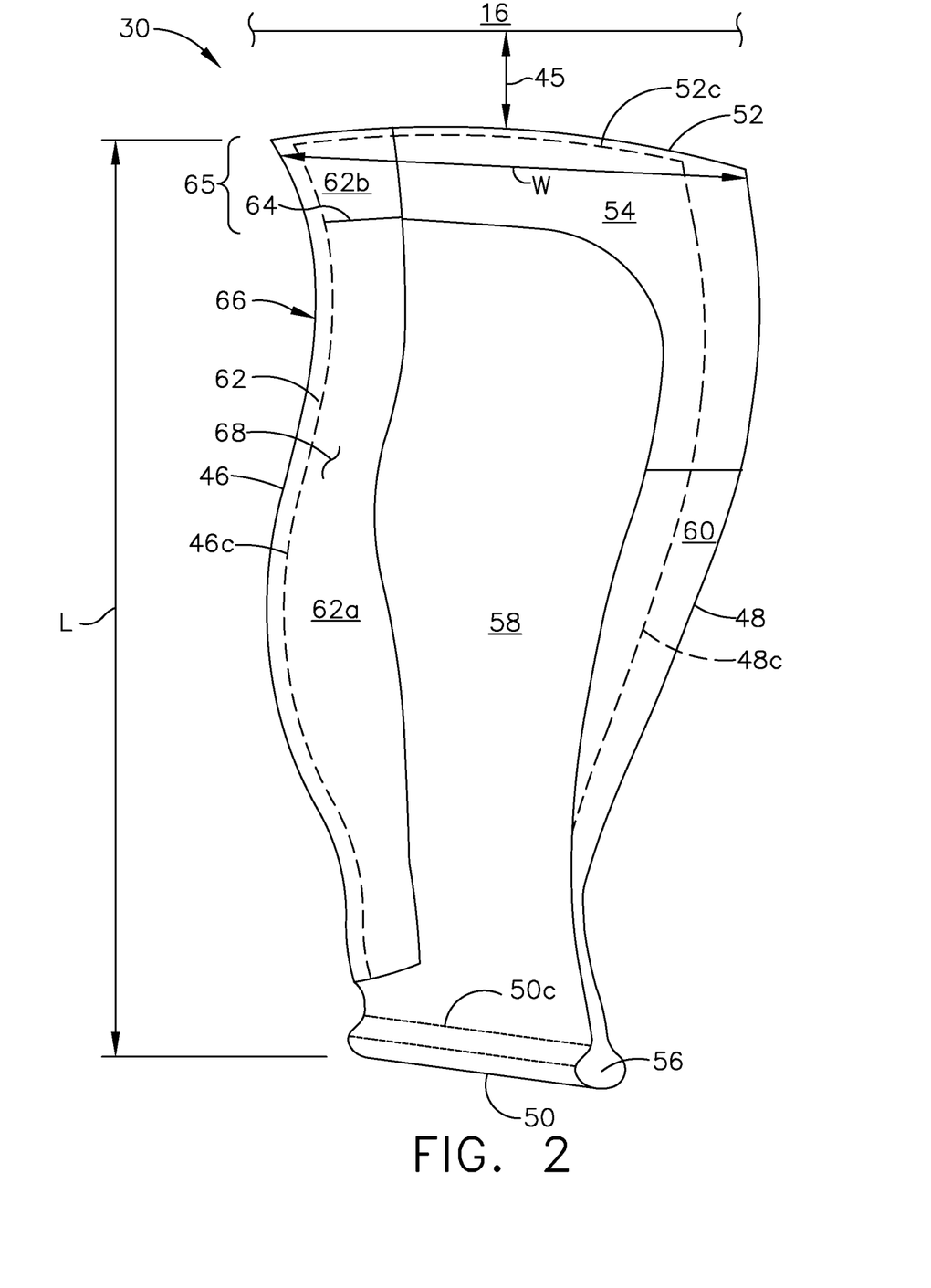
FIG. 2 is an enlarged perspective view of fan blade from FIG. 1 with the fan blade including a leading edge strip.

FIG. 2 is a schematic view of a fan blade 30 for the fan assembly 14 of the turbine engine 10. The fan assembly 14 can be positioned within the nacelle 16 to form a clearance 45 between each fan blade 30 and the nacelle 16. Each fan blade 30 can have an airfoil cross-sectional shape and extend axially between a blade leading edge 46 and a blade trailing edge 48 to define a chord-wise direction and radially between a blade root 50 and a blade tip 52 to define a span-wise direction. The fan blade 30 can include a blade tip cap 54 defining at least a portion of the fan blade 30 at the blade tip 52. By way of non-limiting example the blade tip cap 54 is formed from titanium sheet metal. Alternatively, the blade tip cap 54 can be formed from any material that facilitates operation of the fan assembly 14 as described herein.

The fan blade 30 further includes a dovetail pin 56 that facilitates coupling the fan blade 30 to the rotor disc 32. A composite core 58 can extend from the dovetail pin 56. The entirety of the composite core 58 is illustrated in phantom and can extend axially between a core leading edge 46c and a core trailing edge 48c and radially between a core root 50c and a core tip 52c. It is contemplated that the composite core 52 defines a large portion of the fan blade 30 and can have a hollow interior. It is further contemplated that the core root 50c and the blade root 50 can be one in the same. It is also contemplated that the core tip 52c and the blade tip 52 can be one in the same. The composite core 58 can be formed from glass or carbon fibers, or any suitable composite material.

A trailing edge strip 60 can be provided along the core trailing edge 48c of the fan blade 30. The trailing edge strip 60 can be mounted to the core trailing edge 48c to define at least a portion of the blade trailing edge 48. The trailing edge strip 60 can be formed from titanium sheet metal. Alternatively, the trailing edge strip 60 can be formed from any material that facilitates operation of the fan assembly 14 as described herein.

A leading edge strip 62 can be provided along the core leading edge 46c of the fan blade 30. The leading edge strip 62 can be mounted to the core leading edge 46c to define at least a portion of the blade leading edge 46. The leading edge strip 62 can include a first and second portion 62a, 62b wherein the first portion 62a extends in the span-wise direction from an area along the blade leading edge 46 proximate the blade root 50 toward the blade tip 52. The first portion 62a of the leading edge strip 62 can be formed from any metallic material that facilitates operation of the fan assembly 14 as described herein, including, but not being limited to, titanium alloys, such as Ti64, steel alloys, or nickel alloys. The first portion 62a of the leading edge strip 62 can be formed from a first material being a metallic material having a modulus of elasticity ranging from 15 Msi to 40 Msi. In some aspects of the disclosure herein the modulus of elasticity can range from 15 to 30 Msi. The modulus of elasticity quantifies the tendency of the first or second portions 62a, 62b to deform along an axis when opposing forces are applied along that axis. In other words the modulus of elasticity can quantify the stiffness of a material. An object with a relatively lower modulus of elasticity is a more flexible or pliable material.

The second portion 62b extends radially inward in the span-wise direction from the blade tip 52 toward first portion 62a. A fuse 64 is formed where the first portion 62a meets the second portion 62b. The fuse 64 can be formed, by way of non-limiting example with a butt joint or a lap joint. The first and second portions 62a, 62b can be bonded to each other, by way of non-limiting example using brazing, welding, or adhesive bonding. The first portion 62a can be coupled to the second portion 62b via methods, for example but not limited to, brazing, welding, and adhesive bonding. The second portion 62b of the leading edge strip 62 can be formed from any metallic material that facilitates operation of the fan assembly 14 as described herein and has a modulus of elasticity that is less than the material from which the first portion 62a of the leading edge strip 62 is formed. The second portion 62b can be formed from a second material being a metal, including, but not being limited to, titanium alloys, such as CPTi, and aluminum alloys. The second portion 62b of the leading edge strip 62 can be formed from a metallic material having a modulus of elasticity ranging from 5 Msi to 15 Msi. In another aspect of the disclosure herein the modulus of elasticity of the material from which the second portion 62b is formed can be less than 80% of the value of the material from which the first portion 62a is formed.

The composite core 58 provides a light weight inner structure to the fan blade 30. During operation damage due to contact with foreign objects or extreme temperature differentiations can occur. The trailing edge strip 60 and the leading edge strip 62 are provided to protect the trailing and leading edges 48, 46 of the fan blade 30 from such damage during operation. The leading edge strip 62 has a frangible zone 65 formed by the joined first and second portions 62a, 62b and the reduced moduli of portion 62b. More specifically, the area surrounding the interface of the two materials of the first and second portions 62a, 62b at the fuse 64 forms the beginning of frangible zone 65 extending span-wise to the extent of portion 62b.

The frangible zone 65 is a portion of the blade 30 that is bendable or breakable when the blade comes in contact with, by way of non-limiting example, the nacelle 16 or a foreign object. Contact can occur during, by way of non-limiting example, an FBO as previously described herein. The frangible zone 65 ensures that upon breaking apart of the first and second portions 62a, 62b, the composite core 58 of the fan blade 30 can break into pieces small enough to pass through the engine safely. Consequently a safe shutdown of the engine 10 after an FBO is possible.

The leading edge strip 62, trailing edge strip 60, and blade tip cap 54 can be coupled to the composite core 58 via methods, for example but not limited to, brazing, welding, and adhesive bonding. The leading edge strip 62 has a u-shape, which can be a v-shape, or any shape having a solid nose region 66 and at least one sidewall 68. The leading edge strip 62 can extend radially along a portion or substantially all as illustrated of a radial length (L) of the fan blade 30. The leading edge strip 62 can extend axially in the chord-wise direction along a portion as illustrated or substantially all of an axial width (W) of the fan blade 30.

Figure 3:
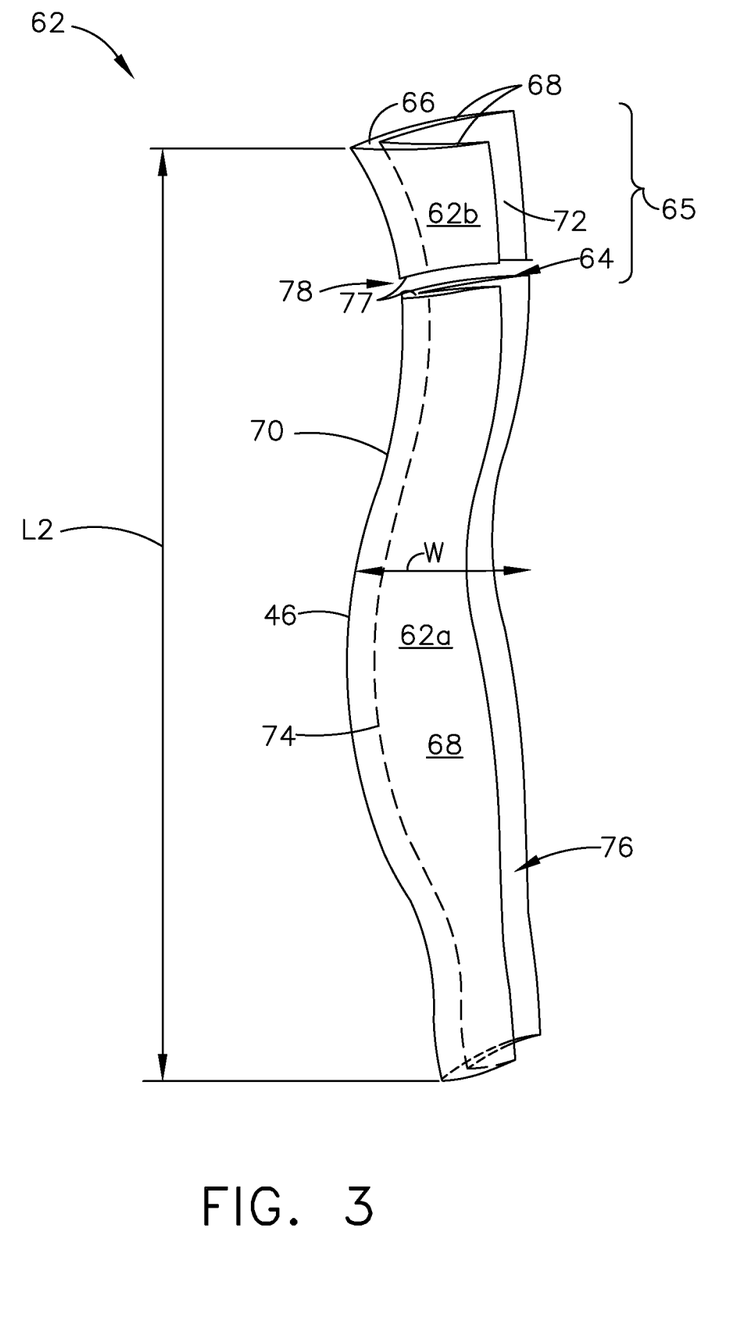
FIG. 3 is a perspective view of the leading edge strip from FIG. 2.

FIG. 3 is a schematic view of the leading edge strip 62 according to an aspect of the disclosure described herein. For clarity, the leading edge strip 62 is separated into the first and second portions 62a, 62b. The solid nose region 66 is configured with an external apex 70 and a second radial length (L2) which can be the same as or smaller than the radial length (L) of the fan blade 30. The at least one sidewall 68 can be two sidewalls 68 extending axially from the external apex 70. It is contemplated that the sidewalls taper from a predetermined thickness at the solid region 66 to a smaller predetermined thickness flush with one of or both of the blade tip cap 54 and the composite core 58. The taper can facilitate a substantially smooth profile along the entire periphery of the fan blade 30 (FIG. 2).

Inner surfaces 72 of the sidewalls 68 form an internal apex 74 at the solid nose region 66. A cavity 76 is formed by the inner surfaces 72 and internal apex 74 to facilitate coupling the leading edge strip 62 to the fan blade 30. The cavity 76 can vary in dimension with variations in the taper of inner surfaces 72, the second radial length (L2), the contours of the internal apex 74, the contours of the composite core 58, and the contours of the blade tip cap 54.

The extent to which the leading edge strip 62 extends in the chord-wise direction is determined by the taper of the inner surfaces 72. The sidewalls 68 can terminate at a strip width (w) which is at least 5% of the axial width (W). It is further contemplated that the strip width (w) is the same for the first portion 62a as for the second portion 62b.

The extent to which the second portion 62b of the leading edge strip 62 defines the second radial length (L2) axially is determined by the location of the fuse 64 with respect to the fan blade 30. The fuse 64 can be located a radial distance x from the blade tip 52 of the leading edge strip 62 where x is at least 5% of the second radial length (L2). It is further contemplated that x is less than 20% of the second radial length (L2). The extent of x is dependent on the amount of area necessary for the frangible zone 65. Weight and efficiency with respect to the engine 10 can also influence the extent of x.

Two opposing ends 77 can form a butt joint 78 defining the fuse 64 of the frangible zone 65. The opposing ends 77 can be bonded to each other by, in a non-limiting example brazing, welding, or adhesive bonding.

Figure 4:
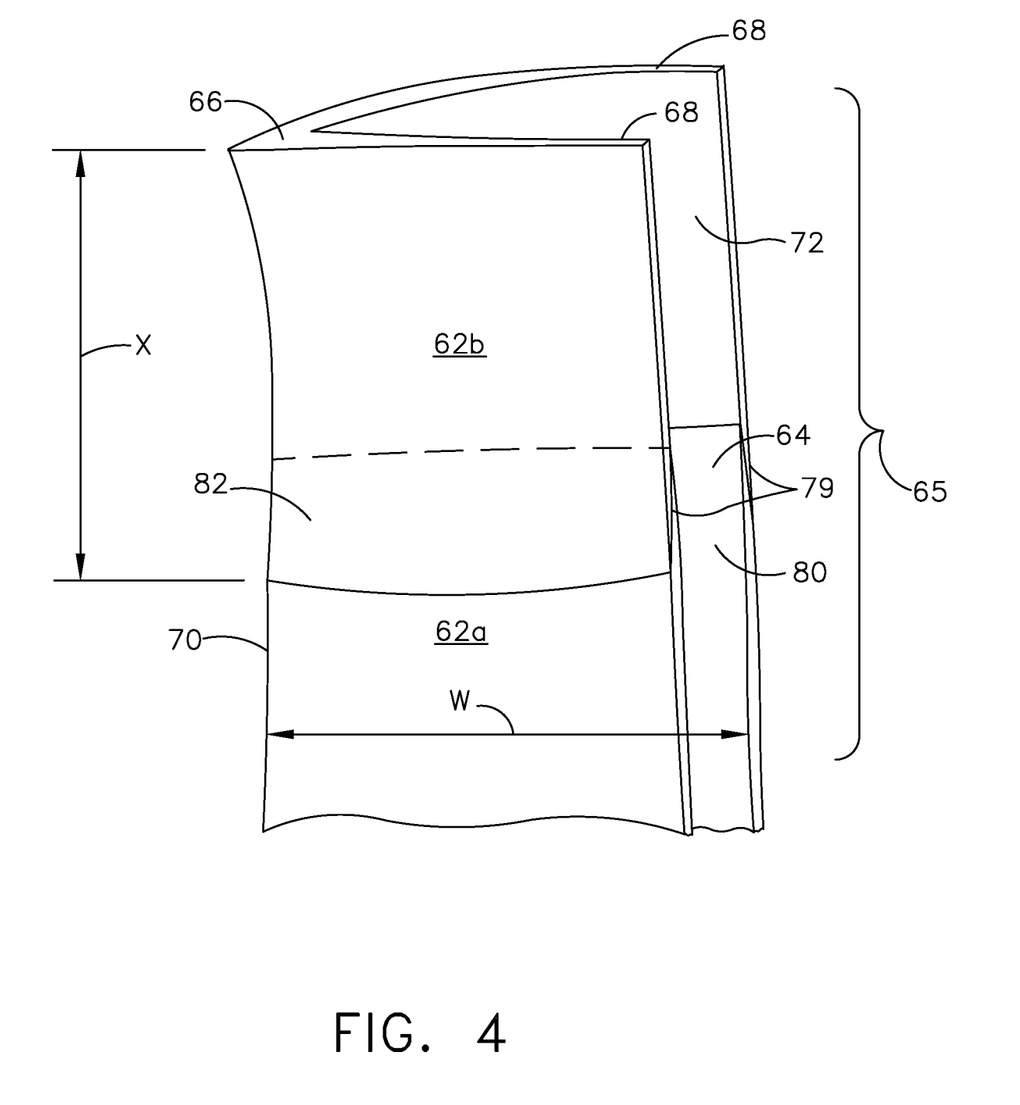
FIG. 4 is an enlarged perspective view of a portion of the leading edge strip from FIG. 3 according to another aspect of the disclosure herein.

FIG. 4 is an enlarged view of the frangible zone 65 with the first and second portions 62a, 62b at the fuse 64 in another aspect of the disclosure herein. The fuse 64 can be a lap joint 79 as illustrated. The first portion 62a can have a first tapered end 80 received within the second portion 62b also terminating in a second tapered end 82. The first tapered end 80 can be bonded to the second tapered end 82 by, in a non-limiting example brazing, welding, or adhesive bonding. While illustrated with the second tapered end 82 over the first tapered end 82, it is contemplated that the first tapered end 80 can be over the second tapered end 82.

Figure 5:
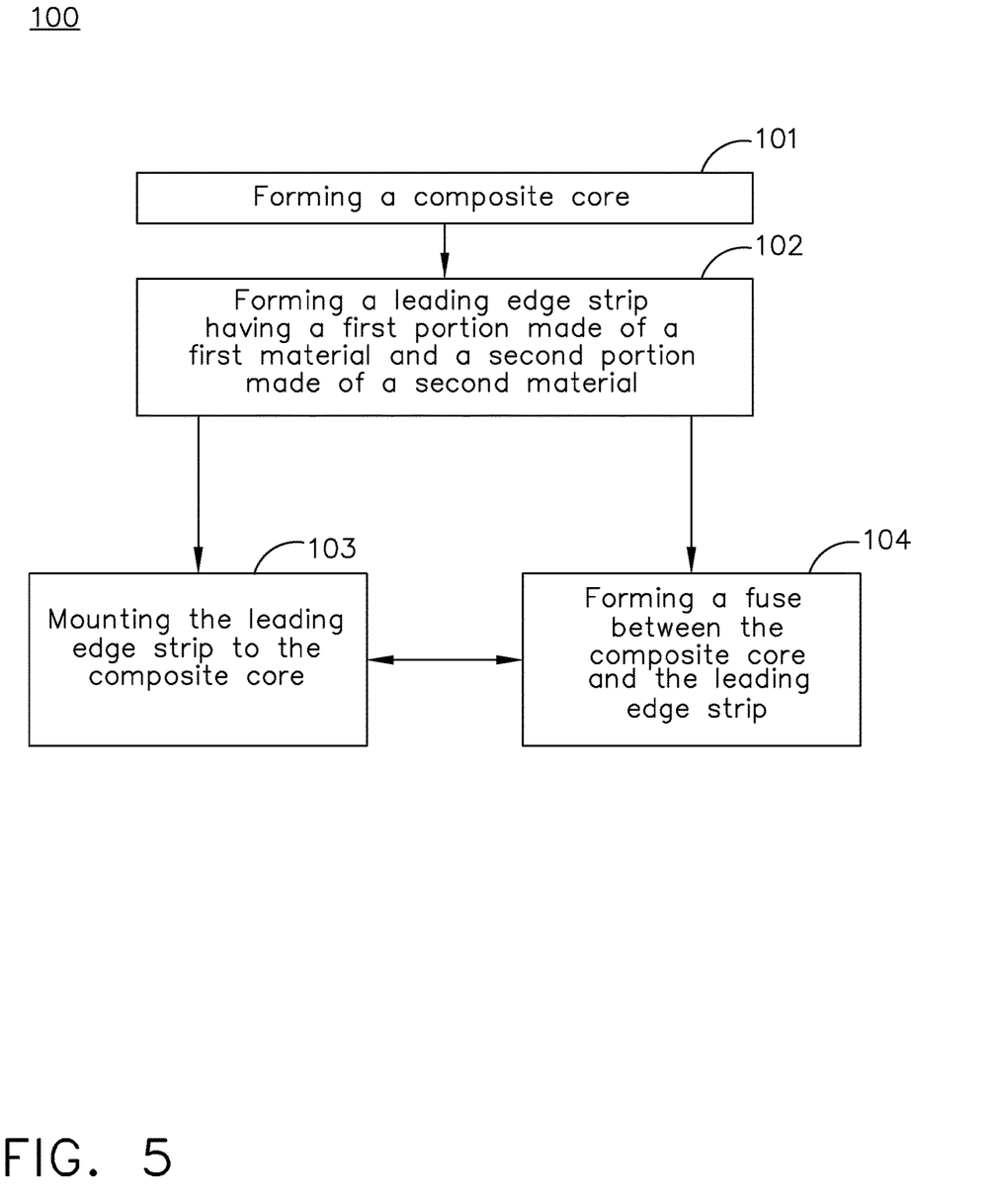
FIG. 5 is a flow chart illustrating a method of forming the fan blade according to an aspect of the disclosure herein.

FIG. 5 illustrates a flow chart for a method 100 of forming the fan blade 30 with the frangible zone 65 as described herein includes at 101 forming the composite core 58. The composite core 58 can be formed using autoclave curing or resin injection molding. At 102 forming the leading edge strip 62 with a first portion 62a made from a first material as disclosed herein and the second portion 62b made from a second material with a lower modulus of elasticity than the first material as disclosed herein. The first portion 62a can be bonded to the second portion 62b by adhesive bond, braze, weld, or additive methods. At 103 mounting the leading edge strip 62 to the composite core 58 using by adhesive bond. It is further contemplated that the first portion 62a is mounted to composite core 58 and then the second portion is mounted to the composite core 58, or vice versa. After mounting is complete, all parts can then be bonded together using methods already mentioned but not limited to adhesive bond, braze, weld, or additive methods. Additionally, using the methods described herein, at 104 forming the fuse 64 between the portions, by way of non-limiting example the first and second portion 62a, 62b, of the leading edge strip 62. The method can include overlapping the first portion 62a with the second portion 62b.

Figure 6:
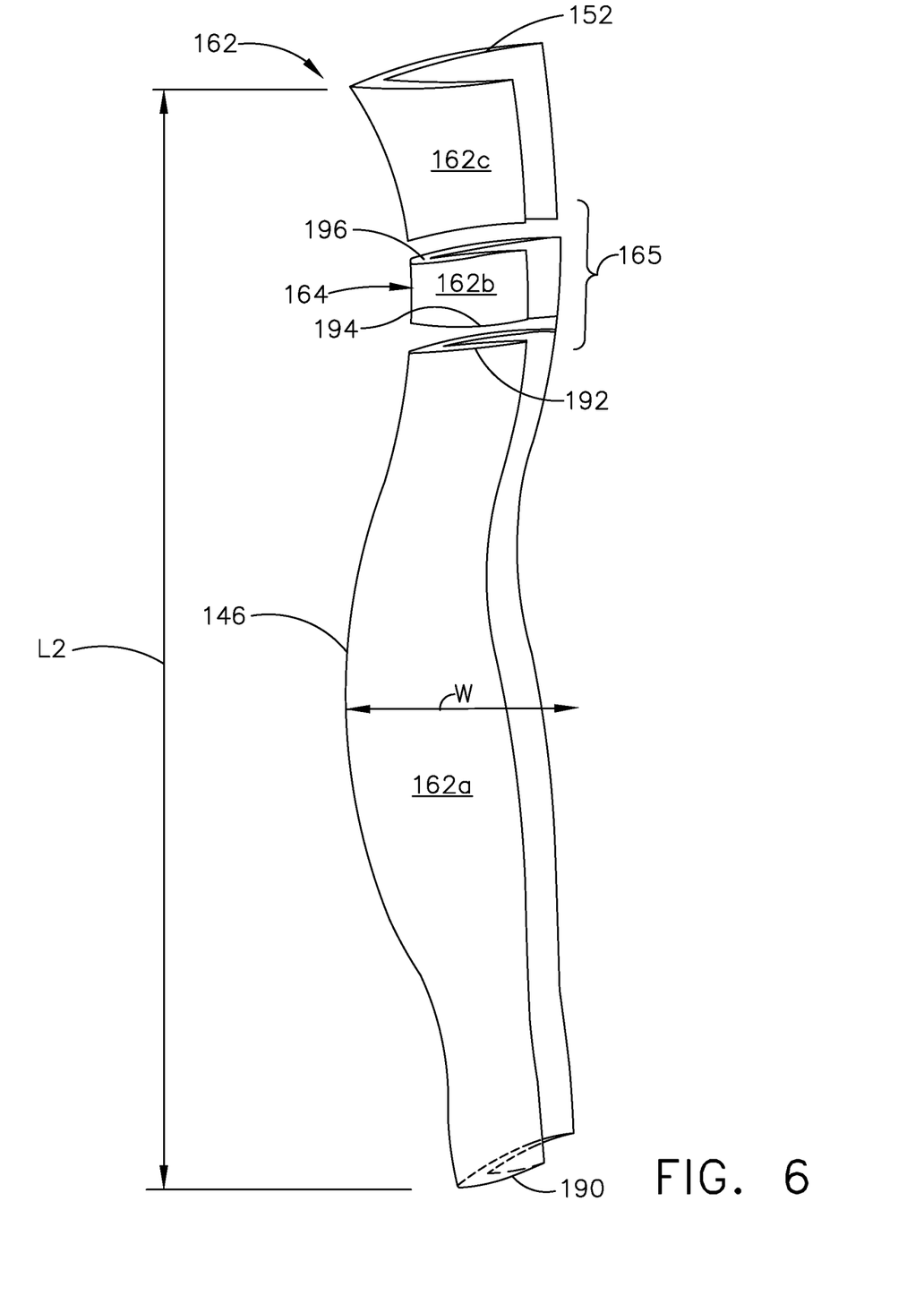
FIG. 6 is a perspective view of a leading edge strip for the fan blade from FIG. 2 according to another aspect of the disclosure herein.

FIG. 6 is a leading edge strip 162 according to another aspect of the disclosure discussed herein. The leading edge strip 162 is substantially similar to the leading edge strip 62. Therefore, like parts will be identified with like numerals increased by 100, with it being understood that the description of the like parts of the leading edge strip 62 applies to the leading edge strip 162 unless otherwise noted.

The leading edge strip 162 can include a third portion 162c. A first portion 162a of the leading edge strip 162 extends in the span-wise direction between, a first end or root portion 190 and a second end 192 defining a majority of a blade leading edge 146 for the blade 30 as described herein. A second portion 162b is made of a material different than the first portion 162a and the third portion 162c. More specifically the second material has a modulus of elasticity that is lower than the modulus of elasticity of the material from which the first portion 162a or the third portion 162c is made. The second portion 162b extends radially outward from the second end 192 in the span-wise direction between a third and fourth end 194, 196.

The third portion 162c extends radially outward from the fourth end 196 in the span-wise direction. The third portion 162c can define at least a portion of a blade tip 152 for the blade 30 as described herein. The third portion 162c can be made of a different material than the first or second portions. It is also contemplated that the third portion 162c is made of the same material as the first portion 162a. The first, second, and third portions 162a, 162b, 162c can be bonded together by way of non-limiting example using brazing, welding, or adhesive bonding methods. The second portion 162b can define a fuse 164 formed between the first and third portions 162a, 162c where a frangible zone 165 can define an area around the fuse 164 for the blade 30 as described herein. It is contemplated that the fuse 164 is formed from two butt joints as illustrated or multiple lap joints formed as previously described herein.

The method as described herein can further include forming the third portion 162c of the leading edge strip 162 from the third material and extending the third portion 162c from the second portion 162b in the chord-wise direction.

Figure 7:
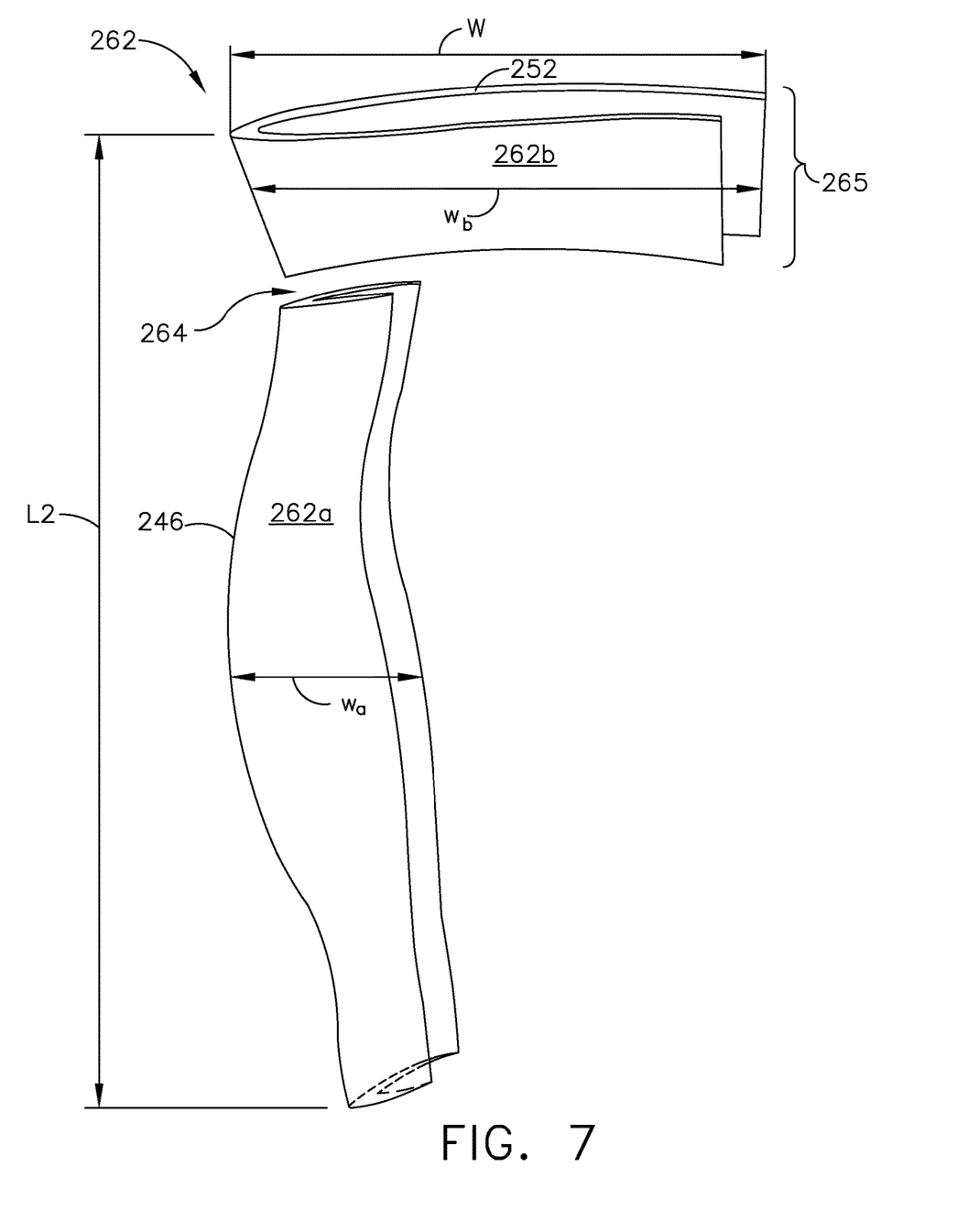
FIG. 7 is a perspective view of a leading edge strip for the fan blade from FIG. 2 according to yet another aspect of the disclosure herein.

FIG. 7 is a leading edge strip 262 according to yet another aspect of the disclosure discussed herein. The leading edge strip 262 is substantially similar to the leading edge strip 62. Therefore, like parts will be identified with like numerals increased by 200, with it being understood that the description of the like parts of the leading edge strip 62 applies to the leading edge strip 262 unless otherwise noted.

A fuse 264 is formed between a first portion 262a and a second portion 262b and defines at least a portion of a frangible zone 265 for the leading edge strip 262. The extent to which the second portion 262b of the leading edge strip 262 extends in the chord-wise direction differs with respect to the extent of which the first portion 262a of the leading edge strip 262 extends in the chord-wise direction. The first portion 262a can terminate at a strip width ($w_a$) which is at least 5% of the axial width (W) and less than 20% of the axial width (W). The second portion 262b can terminate at a strip width ($w_b$) which can be greater than 50% and up to 100% of the axial width (W). In an aspect of the disclosure herein the strip width ($w_b$) of the second portion 262b is greater than the strip width ($w_a$) of the first portion 262a.

It should be understood that while illustrated as having either a first or second width, the first, second, or third portions as described herein can have varying widths with respect to each other and are depicted for illustrative purposes only and are not meant to be limiting.

The method as described herein can further include forming the second portion 262b and extending the second portion 262b in the chord-wise direction to encase more than 50% of the core tip 252c (52c FIG. 1).

Multi-material leading edge strips with a frangible zone enable blade tip fragmentation during a fan blade out event (FBO). An FBO can occur in the event of a bird-strike or other foreign object ingestion within the engine. Enabling blade fragmentation prevents larger pieces, or even the entire blade, from being ingested within the engine. A frangible zone produced by forming a fuse as described herein can eliminate or significantly reduce the amount of trench filler required around the fan blade within the nacelle in a load reduction device design engine, where large rotor orbits are expected due to blade material loss and resulting rotor unbalance, resulting in significant potential weight savings.

To the extent not already described, the different features and structures of the various embodiments can be used in combination with each other as desired. That one feature is not illustrated in all of the embodiments is not meant to be construed that it cannot be, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A leading edge strip for a blade comprising:
   a u-shape having a solid nose region and at least one sidewall, the at least one sidewall extending radially from a root portion along a radial length of the blade defining a span-wise direction and extending axially from the solid nose region along a width of the blade defining a chord-wise direction less than the radial length;
   a first portion made from a first material and extending radially from the root portion, and a second portion, made from a second material different than the first material and extending radially from the first portion, and having a modulus of elasticity less than the first material;
   wherein the leading edge strip is mounted to an exterior portion of the blade.

2. The leading edge strip of claim 1 wherein a third portion made from a third material extends from the second portion in the span-wise direction to define at least a portion of a blade tip.

3. The leading edge strip of claim 2 wherein the third material has a different modulus of elasticity than the second material and the second material extends between the first material and the third material to define a fuse.

4. The leading edge strip of claim 1 wherein the second portion extends from the first portion in the span-wise direction to define at least a portion of a tip.

5. The leading edge strip of claim 1 wherein the second portion defines a strip width extending from the solid nose region in the chord-wise direction that is at least a same width as the first portion.

6. The leading edge strip of claim 1 wherein the second portion defines a strip width extending from the solid nose region in the chord-wise direction that is greater than the first portion.

7. The leading edge strip of claim 1 wherein where the first portion meets the second portion defines a fuse.

8. The leading edge strip of claim 7 wherein the fuse is a butt joint or a lap joint.

9. A blade for a turbine engine, the blade extending axially between a blade leading edge and a blade trailing edge defining a chord-wise direction and having an axial width, and extending radially between a blade root and a blade tip defining a span-wise direction, the blade comprising:
   a composite core extending radially between a core root proximate the blade root and a core tip proximate the blade tip and extending axially between a core leading edge and a core trailing edge; and
   a leading edge strip mounted to the core leading edge to define at least a portion of the blade leading edge, the leading edge strip having a first portion made from a first material joining a second portion made from a second material to form an interface where an area surrounding the interface defines at least a portion of a frangible zone of the blade.

10. The blade of claim 9 wherein the first material has a different modulus of elasticity than the second portion.

11. The blade of claim 9 wherein a third portion made from a third material extends from the second portion in the span-wise direction to define at least a portion of the blade tip.

12. The blade of claim 11 wherein the third material has a different modulus of elasticity than the second material and the second material extends between the first material and the third material to define a fuse.

13. The blade of claim 9 wherein the second portion defines at least a portion of the blade tip.

14. The blade of claim 13 wherein the second portion defines a strip width extending from the blade leading edge in the chord-wise direction that is at least 5% of the axial width.

15. The blade of claim 13 wherein the second portion defines a strip width extending from the blade leading edge in the chord-wise direction that is greater than 50% of the axial width.

16. The blade of claim 9 further comprising a trailing edge strip mounted to at least a portion of the core trailing edge.

17. The blade of claim 9 further comprising a blade tip cap mounted to at least a portion of the core tip.

18. The blade of claim 9 wherein where the first portion meets the second portion defines a fuse.

19. A method for forming a blade having a frangible zone, the method comprising:
 forming a composite core extending axially between a core leading edge and a core trailing edge defining a chord-wise direction and extending radially between a core root and a core tip defining a span-wise direction;
 forming a leading edge strip having a first portion made from a first material and a second portion made from a second material having a lower modulus of elasticity than the first material;
 mounting the leading edge strip to the composite core; and
 forming a fuse between the first and second portions to define at least a portion of the frangible zone.

20. The method of claim 19 further comprising forming a third portion of the leading edge strip from a third material extending from the second portion.

21. The method of claim 19 further comprising extending the second portion in the chord-wise direction to encase more than 50% of the core tip.

22. The method of claim 19 further comprising overlapping the first portion with the second portion.

23. The method of claim 19 wherein the mounting occurs prior to the forming of a fuse.

24. The method of claim 19 wherein the forming of a fuse occurs prior to the mounting of the leading edge strip.

* * * * *